United States Patent Office 3,155,474
Patented Nov. 3, 1964

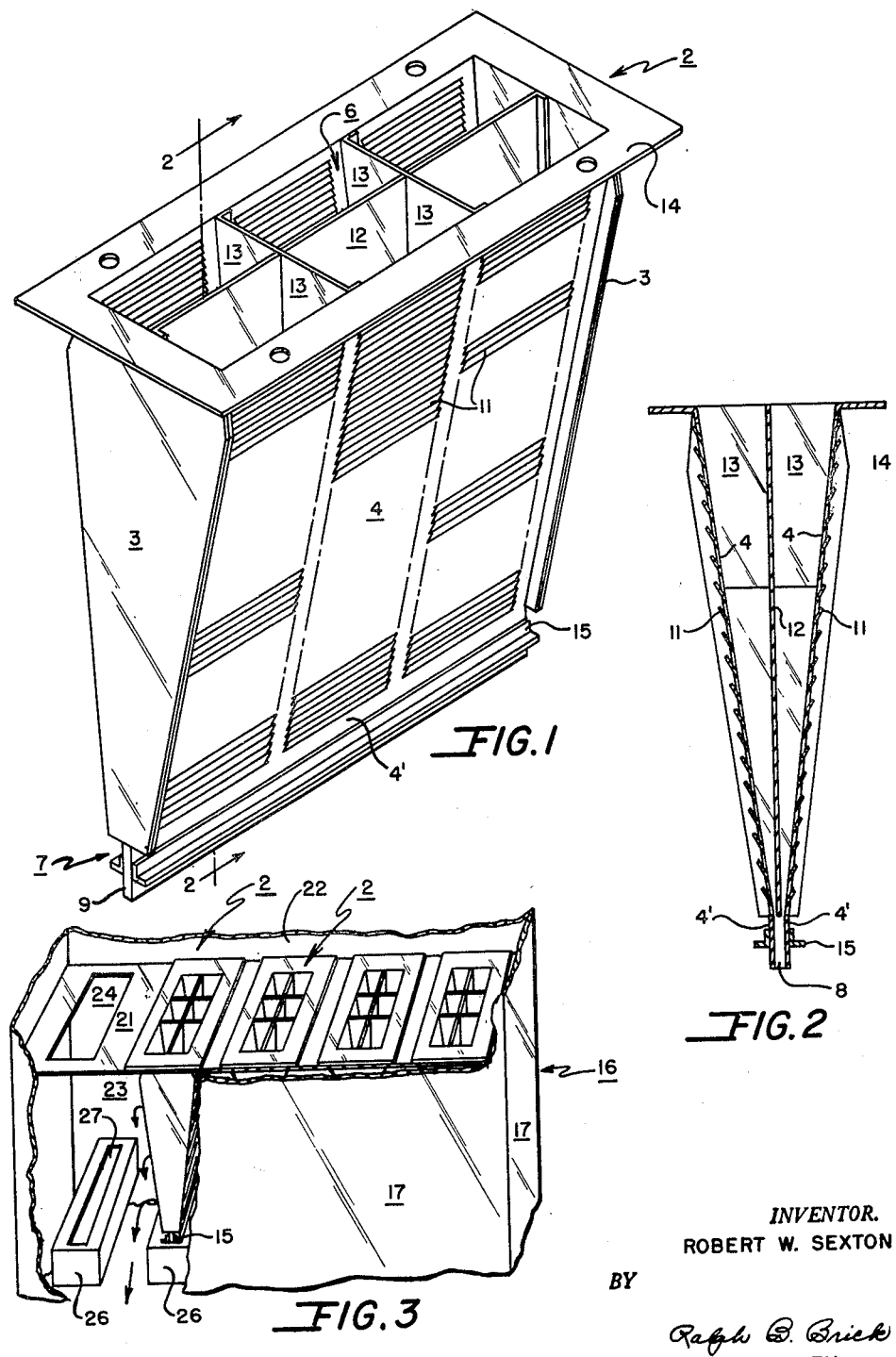

3,155,474
DUST SEPARATOR
Robert W. Sexton, Louisville, Ky., assignor to American Air Filter Company, Inc., Louisville, Ky., a corporation of Delaware
Filed Nov. 16, 1959, Ser. No. 853,147
3 Claims. (Cl. 55—418)

The invention relates to dust separating apparatus and more particularly to dust separating apparatus of the louver type wherein dust is separated from a dirty gas stream by passing the gas stream through louvers disposed so as to abruptly change the direction of flow of the gas stream to arrest the dust particles from such stream.

In accordance with the present invention, a novel and useful dust separating assembly is provided which operates with high dust separating efficiency so that a maximum of dust particles is removed from a treated gas stream and restrained from re-entry after such removal. In addition, the present invention provides a dust separating assembly which is compact in form, economical to manufacture and operate, and which can be readily arranged in a plurality of banks to treat large volumes of dirty gas in an efficient manner.

Various other features of the present invention will become obvious to one skilled in the art upon reading the disclosure set forth hereinafter.

More particularly, the present invention provides a dust separating assembly comprising a casing having a dirty gas inlet and a dust particle outlet opposite the gas inlet, the casing including oppositely disposed side walls bounding the gas flow path from the dirty gas inlet, a plurality of louvers in the oppositely disposed side walls, the louvers being so disposed that gas flowing from the gas flow path is abruptly changed in its direction as it passes through the louvers, and a partition extending along the gas flow path toward the dust particle outlet and intermediate the oppositely disposed side walls to prevent dust particles arrested from the gas by the louvers in one side wall from being deflected through the louvers in the side wall opposite thereto.

It is to be understood thtat various changes can be made in the arrangement, form and construction of the apparatus disclosed herein without departing from the scope or spirit of the present invention.

Referring to the drawings which disclose an advantageous embodiment of the present invention:

FIGURE 1 is a perspective view of one of the inventive dust separating assemblies;

FIGURE 2 is a sectional view taken in a plane passing through line 2—2 of FIGURE 1; and, FIGURE 3 is a perspective view, on a reduced scale, of a portion of a housing incorporating part of a bank of dust separating assemblies like that disclosed in FIGURES 1 and 2.

As can be seen in FIGURE 1 of the drawings, the inventive apparatus is disclosed in the form of a casing 2 which includes spaced end walls 3 of truncated triangular shape adjoining rectangularly shaped, spaced side walls 4, the upper edges of the four adjoining walls defining the perimeter of dirty gas inlet 6 and the lower edges of the walls defining the perimeter of the dust particle outlet broadly referred to by the reference numeral 7. It is to be noted that side walls 4 converge toward each other in the direction of dust particle outlet 7 to form a diminishing flow area for the gases and solids passing therethrough, the walls 4 including end portions 4' arranged in spaced parallel relation to form outlet passage 8 (FIGURE 2). Strips of metal are welded between the spaced parallel end portions 4' at the extremities thereof to serve as end walls 9 of outlet passage 8 (only one such strip being disclosed in FIGURE 1 of the drawings).

Each of side walls 4 is provided with a plurality of spaced louvers 11 which extend transverse the direction of gas flow from dirty gas inlet 6, the spaced louvers forming clean gas outlets passages therebetween. As can be seen in FIGURE 1, spaced louvers 11 are arranged in rows with the louvers being inclined from their respective walls 4 so as to insure an abrupt change in the direction of gas flow and to thereby arrest dust particles in the gas stream by centrifugal action. It is to be understood that the spaced louvers can be arranged in any number of rows desired with their angles of inclination to the walls also arranged in accordance with the particular results desired.

Extending between end walls 3 intermediate side walls 4 from dirty gas inlet 6 to dust particle outlet 7 is an impervious partition 12 (FIGURE 2). With partition 12 so positioned between spaced louvers 11 of opposite side walls 4, the dust separating efficiency of the assembly is increased to a degree heretofore unknown in the art of dust louver separation, partition 12 serving to restrain any dust particles arrested from the gas stream by the inclined louvers of one wall from being otherwise deflected through the passages between the louvers of the opposite wall. To hold partition 12 in intermediate spaced relationship from wall 4 and to insure proper gas flow through louvers 11, a plurality of spaced straightening vanes 13 are provided. These vanes, which extend along the direction of gas flow less than half the length of plate 12, in perpendicular relationship to such plate and the walls 4, serve to divide gas inlet 6 into an egg-crate arrangement of gas straightening cellular passages. It is to be understood that plates 13 can be eliminated if desired and a plurality of suitable support rods (not shown) used in their stead.

It is to be noted that casing 2 is provided with a perimetric rectangular border strip 14 which extends at right angles from walls 3 and 4 to surround dirty gas inlet 6. It also is to be noted that a pair of right angle members are provided at the dust outlet passage 8, being mounted to wall end portions 4' to provide strips 15 extending from either side of outlet passage 8. These strips 14 and 15 serve to support casing 2 when it is inserted in a housing as one of a plurality of casings to treat large volumes of dirty gas.

Referring to FIGURE 3 of the drawings, such a housing 16, as abovementioned, is disclosed. Housing 16, formed by side walls 17 to provide a rectangular gas passageway includes a dirty gas inlet and a clean gas outlet (not shown). Extending transverse the direction of gas flow in housing 16 is a dividing wall 21 which serves to form in housing 16 dirty gas plenum 22 upstream thereof which communicates with the dirty gas inlet and clean gas plenum 23 downstream thereof which communicates with the clean gas outlet. Dividing wall 21 is provided with a plurality of rectangular apertures 24. Each aperture 24 is dimensioned to accommodate for ready removal a casing 2 so that the perimetric border strip 14 abuts in sealing relationship against the upstream face of dividing wall 21. Positioned downstream dividing wall 21 and extending transverse the direction of gas flow are a plurality of spaced dust troughs 26. Each dust trough 26 is provided with an aperture 27 that is aligned with an aperture 24 of the dividing wall 21 upstream thereof. Apertures 27 of the dust troughs each serve to receive the extremity of an outlet passage 8 of a casing 2 so that the border strips 15 of a casing sealably engage against the walls of the dust trough.

From the aforegoing description, it will be obvious that casings 2 can be assembled readily in housing 16 simply by inserting the casings, dust outlet passages first, through apertures 24 so that such dust outlet passages engage in the apertures 27 corresponding with apertures 24. Once casings 2 are inserted through apertures 24 with their borders 14 and 15 sealingly engaged with the dividing wall 21 and the walls of the dust troughs 26 respectively, the overall arrangement is ready for use.

In a typical operation, gas to be cleaned is introduced into dirty gas plenum 22 of housing 16 through the dirty gas inlet, a suitable blower (not shown) being positioned at the inlet or somewhere along a header (not shown) for dust troughs 26. The gas enters into the dirty gas inlets 6 of casings 2, flowing along either side of partitions 12 and through the gas outlet passages formed by the louvers 11. Since louvers 11 are disposed to abrutly change the direction of gas flow, the dust particles in the gas are arrested therefrom by centrifugal action and, instead of passing along with the gas into the clean gas plenum 23 and through the clean gas outlet of the housing, the dust particles are reflected from the louvers 11 into casings 2 to settle into dust troughs 26. It is to be noted that some of the reflected dust particles strike against partitions 12 and are thus restrained from passing through passages formed by the louvers 11 on the side walls opposite to the walls where such particles were arrested by centrifugal action. If it were not for such partitions 12, a good number of dust particles would pass through the louvers in the opposite walls from where they were arrested since the angle of reflection of the particles corresponds substantially to the angle of disposition of the louvers 11. It also is to be noted that partitions 12 can be treated or covered with suitable dampening material, such as cloth, the partitions further serving as a means for channeling the reflected dust particles into dust troughs 26. The dust collected in troughs 26 can be passed on through a header connected to the troughs as abovementioned (not shown) and can be either collected for possible use elsewhere or passed to atmosphere, depending upon the economics of the operation and the material separated.

The invention claimed is:

1. Apparatus for separating dust particles from a gaseous stream comprising a casing having a dirty gas inlet and a dust particle outlet opposite said gas inlet, said casing including oppositely disposed side walls bounding the gas flow path from said dirty gas inlet, said side walls converging toward each other in the direction of said dust particle outlet to form a diminishing flow area of the gases and solids passing therethrough, a plurality of louvers in said oppositely disposed side walls, said louvers being disposed so that gas flowing from said gas flow path is abruptly changed in its direction of flow as it passes through said louvers, and a flat, gas impervious partition plate extending solely intermediate substantially the entire louvered portion of said oppositely disposed side walls parallel to and along the initial direction of said gas flow path toward said dust particle outlet to prevent dust particles arrested from the gas by the louvers in one side wall from being deflected through the louvers in the side wall opposite thereto and to serve as a means for channeling the dust particles to said dust particle outlet.

2. Apparatus for separating dust particles from a gaseous stream comprising a casing having a dirty gas inlet and a dust particle outlet opposite said gas inlet, said casing including oppositely disposed side walls bounding the gas flow path from said dirty gas inlet, said side walls converging toward each other in the direction of said dust particle outlet to form a diminishing flow area for the gases and solids passing therethrough, a plurality of straightening vanes extending across said dirty gas inlet, said vanes being arranged to form cellular passages to control the direction of flow of gas through said inlet, a plurality of louvers in said oppositely disposed side walls said louvers extending transverse the direction of gas flow and being so disposed that gas flowing from said gas flow path is abruptly changed in its direction of flow as it passes through said louvers, and a flat, gas impervious partition plate extending solely intermediate substantially the entire louvered portion of said oppositely disposed side walls parallel to and along the initial direction of said gas flow path toward said dust particle outlet to prevent dust particles arrested from the gas by the louvers in one side wall from being deflected through the louvers in the side wall opposite thereto and to serve as a means for channeling the dust particles to said dust particle outlet.

3. Apparatus for separating dust particles from a gaseous stream comprising: a housing through which a gaseous stream can be passed; a dividing wall in said housing extending transverse the direction of flow of such gaseous stream to provide a dirty gas plenum upstream thereof and a clean gas plenum downstream thereof, said dividing wall having aperture means disposed therein; dust trough means in said clean gas plenum extending transverse the direction of flow of such gaseous stream in spaced relationship downstream from said dividing wall, said dust trough means having aperture means aligned with the aperture means in said dividing wall to form spaced aperture pair means; and, dust separator means removably supported within said spaced aperture pair means, said dust-separator means including a casing having a dirty gas inlet communicating with said dirty gas plenum chamber and a dust particle outlet communicating with said dust trough means, said casing further including oppositely disposed side walls converging toward each other in the direction of said dust particle outlet and bounding the gas flow path from said dirty gas inlet to said dust particle outlet, a plurality of louvers in said oppositely disposed side walls, said louvers being disposed so that gas flowing from said gas flow path is abruptly changed in its direction of flow as it passes through said louvers whereby dust particles are arrested from said gas to pass to said dust trough means and the cleaned gas passes through said louvers into said clean gas plenum, and a flat gas impervious partition plate in said casing extending from said dirty gas inlet of said casing parallel to and along the initial direction of said gas flow path to said dust particle outlet and solely intermediate said oppositely disposed side walls to prevent dust particles arrested from the gas by said louvers from being deflected through said louvers in the side wall opposite thereto and to serve as a means for channeling the dust particles to said dust particle outlet in said dust trough.

References Cited in the file of this patent

UNITED STATES PATENTS

| 522,769 | Thompson et al. | July 10, 1894 |
| 2,076,815 | Fulweiler | Apr. 13, 1937 |
| 2,152,115 | Van Tongeren | Mar. 28, 1939 |
| 2,712,858 | Wintermute | July 12, 1955 |
| 2,771,157 | Gustavsson | Nov. 20, 1956 |
| 2,976,952 | Holland | Mar. 28, 1961 |

FOREIGN PATENTS

| 184,282 | Switzerland | May 31, 1936 |
| 185,137 | Switzerland | July 15, 1936 |
| 119,075 | Sweden | Apr. 24, 1947 |
| 129,415 | Sweden | July 6, 1950 |